United States Patent
Nishimura et al.

(10) Patent No.: US 7,525,398 B2
(45) Date of Patent: Apr. 28, 2009

(54) ACOUSTICALLY COMMUNICATING DATA SIGNALS ACROSS AN ELECTRICAL ISOLATION BARRIER

(75) Inventors: Ken Nishimura, Fremont, CA (US); John D. Larson, III, Palo Alto, CA (US); Stephen R. Gilbert, San Francisco, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 461 days.

(21) Appl. No.: 11/252,845

(22) Filed: Oct. 18, 2005

(65) Prior Publication Data

US 2007/0086274 A1 Apr. 19, 2007

(51) Int. Cl.
- H03H 9/50 (2006.01)
- H03H 9/54 (2006.01)
- H04L 27/00 (2006.01)
- H03K 9/02 (2006.01)
- H03K 7/02 (2006.01)
- H03K 7/06 (2006.01)

(52) U.S. Cl. .............. 333/189; 310/323; 310/334; 375/300; 375/302; 375/340; 375/353; 375/239; 379/93.05; 379/399.01

(58) Field of Classification Search ............... 333/189; 310/323, 328, 334
See application file for complete search history.

(56) References Cited

U.S. PATENT DOCUMENTS

| | | | |
|---|---|---|---|
| 3,174,122 A | 3/1965 | Fowler et al. | |
| 3,189,851 A | 6/1965 | Fowler | |
| 3,321,648 A | 5/1967 | Kolm | |
| 3,422,371 A | 1/1969 | Poirier et al. | |
| 3,568,108 A | 3/1971 | Poirier et al. | |
| 3,582,839 A | 6/1971 | Pim et al. | |
| 3,590,287 A | 6/1971 | Berlincourt et al. | |
| 3,610,969 A | 10/1971 | Clawson et al. | |

(Continued)

FOREIGN PATENT DOCUMENTS

DE    10160617    6/2003

(Continued)

OTHER PUBLICATIONS

Ruby, R. C., "Micro-Machined Thin Film Bulk Acoustic Resonators", *Proc. IEEE 48th, Symposium on Frequency control*, (1994), 135-138.

(Continued)

*Primary Examiner*—Barbara Summons (57) ABSTRACT

In one aspect, a data communication system includes a modulator, an integrated acoustic data coupler, and a demodulator. The modulator modulates a carrier signal having a frequency in an operating frequency range in response to an input data signal and provides the modulated carrier signal at a modulator output. The integrated acoustic data coupler includes an acoustically resonant structure that has one or more acoustic resonant frequencies in the operating frequency range. The acoustically resonant structure includes a first thin film electro-acoustic transducer electrically coupled to the modulator output, a second thin film electro-acoustic transducer, and a substrate. The substrate supports, acoustically couples, and provides an electrical isolation barrier between the first and second thin film electro-acoustic transducers. The demodulator has a demodulator input coupled to the second thin film electro-acoustic transducer and is operable to generate an output data signal from an input signal received at the demodulator input.

20 Claims, 7 Drawing Sheets

U.S. PATENT DOCUMENTS

| | | | |
|---|---|---|---|
| 3,826,931 A | 7/1974 | Hammond | |
| 3,845,402 A | 10/1974 | Nupp | |
| 4,084,217 A | 4/1978 | Brandis et al. | |
| 4,172,277 A | 10/1979 | Pinson | |
| 4,272,742 A | 6/1981 | Lewis | |
| 4,281,299 A | 7/1981 | Newbold | |
| 4,320,365 A | 3/1982 | Black et al. | |
| 4,355,408 A | 10/1982 | Scarrott | |
| 4,456,850 A | 6/1984 | Inoue et al. | |
| 4,529,904 A | 7/1985 | Hattersley | |
| 4,625,138 A | 11/1986 | Ballato | |
| 4,640,756 A | 2/1987 | Wang et al. | |
| 4,719,383 A | 1/1988 | Wang et al. | |
| 4,798,990 A | 1/1989 | Henoch | |
| 4,836,882 A | 6/1989 | Ballato | |
| 4,841,429 A | 6/1989 | Mcclanahan et al. | |
| 4,906,840 A | 3/1990 | Zdeblick et al. | |
| 5,048,036 A | 9/1991 | Scifres et al. | |
| 5,048,038 A | 9/1991 | Brennan et al. | |
| 5,075,641 A | 12/1991 | Weber et al. | |
| 5,118,982 A | 6/1992 | Inoue et al. | |
| 5,129,132 A | 7/1992 | Zdeblick et al. | |
| 5,162,691 A | 11/1992 | Mariani et al. | |
| 5,233,259 A | 8/1993 | Krishnaswamy et al. | |
| 5,241,209 A | 8/1993 | Sasaki | |
| 5,241,456 A | 8/1993 | Marcinkiewicz et al. | |
| 5,294,898 A | 3/1994 | Dworsky et al. | |
| 5,361,077 A * | 11/1994 | Weber | 343/846 |
| 5,382,930 A | 1/1995 | Stokes et al. | |
| 5,384,808 A | 1/1995 | Van Brunt et al. | |
| 5,448,014 A | 9/1995 | Kong et al. | |
| 5,465,725 A | 11/1995 | Seyed-Bolorforosh | |
| 5,548,189 A | 8/1996 | Williams | |
| 5,587,620 A | 12/1996 | Ruby et al. | |
| 5,589,858 A | 12/1996 | Kadowaki et al. | |
| 5,594,705 A | 1/1997 | Connor et al. | |
| 5,633,574 A | 5/1997 | Sage | |
| 5,671,242 A | 9/1997 | Takiguchi et al. | |
| 5,692,279 A | 12/1997 | Mang et al. | |
| 5,705,877 A | 1/1998 | Shimada | |
| 5,714,917 A | 2/1998 | Ella | |
| 5,853,601 A | 12/1998 | Krishaswamy et al. | |
| 5,864,261 A | 1/1999 | Weber | |
| 5,866,969 A | 2/1999 | Shimada et al. | |
| 5,872,493 A | 2/1999 | Ella | |
| 5,873,153 A | 2/1999 | Ruby et al. | |
| 5,873,154 A | 2/1999 | Ylilammi et al. | |
| 5,894,184 A | 4/1999 | Furuhashi et al. | |
| 5,894,647 A | 4/1999 | Lakin | |
| 5,910,756 A | 6/1999 | Ella | |
| 5,932,953 A | 8/1999 | Drees et al. | |
| 5,936,150 A | 8/1999 | Kobrin et al. | |
| 5,953,479 A | 9/1999 | Zhou et al. | |
| 5,982,297 A | 11/1999 | Welle | |
| 6,040,962 A | 3/2000 | Kanazawa | |
| 6,060,818 A | 5/2000 | Ruby et al. | |
| 6,087,198 A | 7/2000 | Panasik | |
| 6,107,721 A | 8/2000 | Lakin | |
| 6,111,480 A | 8/2000 | Iyama et al. | |
| 6,124,678 A | 9/2000 | Bishop et al. | |
| 6,124,756 A | 9/2000 | Yaklin et al. | |
| 6,150,703 A | 11/2000 | Cushman et al. | |
| 6,187,513 B1 | 2/2001 | Katakura | |
| 6,215,375 B1 | 4/2001 | Larson, III et al. | |
| 6,219,263 B1 | 4/2001 | Wuidart | |
| 6,228,675 B1 | 5/2001 | Ruby et al. | |
| 6,229,247 B1 | 5/2001 | Bishop | |
| 6,252,229 B1 | 6/2001 | Hays et al. | |
| 6,262,600 B1 | 7/2001 | Haigh et al. | |
| 6,262,637 B1 | 7/2001 | Bradley et al. | |
| 6,265,246 B1 | 7/2001 | Ruby et al. | |
| 6,278,342 B1 | 8/2001 | Ella | |
| 6,292,336 B1 | 9/2001 | Horng | |
| 6,307,447 B1 | 10/2001 | Barber et al. | |
| 6,307,761 B1 | 10/2001 | Nakagawa | |
| 6,366,006 B1 | 4/2002 | Boyd | |
| 6,376,280 B1 | 4/2002 | Ruby et al. | |
| 6,377,137 B1 | 4/2002 | Ruby | |
| 6,384,697 B1 | 5/2002 | Ruby | |
| 6,407,649 B1 | 6/2002 | Tikka et al. | |
| 6,414,569 B1 | 7/2002 | Nakafuku | |
| 6,420,820 B1 | 7/2002 | Larson, III | |
| 6,424,237 B1 | 7/2002 | Ruby et al. | |
| 6,429,511 B2 | 8/2002 | Ruby et al. | |
| 6,434,030 B1 | 8/2002 | Rehm et al. | |
| 6,437,482 B1 | 8/2002 | Shibata | |
| 6,441,539 B1 | 8/2002 | Kitamura et al. | |
| 6,462,631 B2 | 10/2002 | Bradley et al. | |
| 6,466,105 B1 | 10/2002 | Lobl et al. | |
| 6,466,418 B1 | 10/2002 | Horng | |
| 6,469,597 B2 | 10/2002 | Ruby et al. | |
| 6,472,954 B1 | 10/2002 | Ruby et al. | |
| 6,476,536 B1 | 11/2002 | Pensala | |
| 6,479,320 B1 | 11/2002 | Gooch | |
| 6,483,229 B2 | 11/2002 | Larson, III et al. | |
| 6,486,751 B1 | 11/2002 | Barber et al. | |
| 6,489,688 B1 | 12/2002 | Baumann et al. | |
| 6,492,883 B2 | 12/2002 | Liang et al. | |
| 6,507,983 B1 | 1/2003 | Ruby et al. | |
| 6,515,558 B1 | 2/2003 | Ylilammi | |
| 6,518,860 B2 | 2/2003 | Ella et al. | |
| 6,525,996 B1 | 2/2003 | Miyazawa | |
| 6,530,515 B1 | 3/2003 | Glenn et al. | |
| 6,534,900 B2 | 3/2003 | Aigner et al. | |
| 6,542,055 B1 | 4/2003 | Frank et al. | |
| 6,548,942 B1 | 4/2003 | Panaski | |
| 6,550,664 B2 | 4/2003 | Bradley et al. | |
| 6,564,448 B1 | 5/2003 | Oura et al. | |
| 6,566,979 B2 | 5/2003 | Larson et al. | |
| 6,583,374 B2 | 6/2003 | Knieser et al. | |
| 6,583,688 B2 | 6/2003 | Klee et al. | |
| 6,593,870 B2 | 7/2003 | Dummermuth et al. | |
| 6,600,390 B2 | 7/2003 | Frank | |
| 6,601,276 B2 | 8/2003 | Barber | |
| 6,617,249 B2 | 9/2003 | Ruby et al. | |
| 6,617,750 B2 | 9/2003 | Dummermuth et al. | |
| 6,630,753 B2 | 10/2003 | Malik et al. | |
| 6,635,509 B1 | 10/2003 | Ouellet | |
| 6,639,872 B1 | 10/2003 | Rein | |
| 6,651,488 B2 | 11/2003 | Larson et al. | |
| 6,657,363 B1 | 12/2003 | Aigner | |
| 6,668,618 B2 | 12/2003 | Larson et al. | |
| 6,670,866 B2 | 12/2003 | Ella et al. | |
| 6,693,500 B2 | 2/2004 | Yang et al. | |
| 6,710,508 B2 | 3/2004 | Ruby et al. | |
| 6,710,681 B2 | 3/2004 | Figueredo et al. | |
| 6,714,102 B2 | 3/2004 | Ruby et al. | |
| 6,720,844 B1 | 4/2004 | Lakin | |
| 6,720,846 B2 | 4/2004 | Iwashita et al. | |
| 6,724,266 B2 | 4/2004 | Plazza et al. | |
| 6,774,746 B2 | 8/2004 | Whatmore et al. | |
| 6,777,263 B1 | 8/2004 | Gan et al. | |
| 6,787,048 B2 | 9/2004 | Bradley et al. | |
| 6,788,170 B1 | 9/2004 | Kaitila et al. | |
| 6,803,835 B2 | 10/2004 | Frank | |
| 6,812,619 B1 | 11/2004 | Kaitila et al. | |
| 6,828,713 B2 | 12/2004 | Bradley et al. | |
| 6,842,088 B2 | 1/2005 | Yamada et al. | |
| 6,842,089 B2 | 1/2005 | Lee | |
| 6,873,065 B2 | 3/2005 | Haigh et al. | |
| 6,873,529 B2 | 3/2005 | Ikuta | |
| 6,874,211 B2 | 4/2005 | Bradley et al. | |
| 6,874,212 B2 | 4/2005 | Larson, III | |
| 6,888,424 B2 | 5/2005 | Takeuchi et al. | |

| | | |
|---|---|---|
| 6,900,705 B2 | 5/2005 | Nakamura et al. |
| 6,903,452 B2 | 6/2005 | Ma et al. |
| 6,906,451 B2 | 6/2005 | Yamada |
| 6,911,708 B2 | 6/2005 | Park |
| 6,917,261 B2 | 7/2005 | Unterberger |
| 6,924,583 B2 | 8/2005 | Lin et al. |
| 6,924,717 B2 | 8/2005 | Ginsburg et al. |
| 6,927,651 B2 | 8/2005 | Larson, III et al. |
| 6,936,928 B2 | 8/2005 | Hedler et al. |
| 6,936,954 B2 | 8/2005 | Peczalski |
| 6,943,648 B2 | 9/2005 | Maiz et al. |
| 6,946,928 B2 | 9/2005 | Larson et al. |
| 6,954,121 B2 | 10/2005 | Bradley et al. |
| 6,963,257 B2 | 11/2005 | Ella et al. |
| 6,970,365 B2 | 11/2005 | Turchi |
| 6,975,183 B2 | 12/2005 | Aigner et al. |
| 6,977,563 B2 | 12/2005 | Komuro et al. |
| 6,985,052 B2 | 1/2006 | Tikka |
| 6,987,433 B2 | 1/2006 | Larson et al. |
| 6,989,723 B2 | 1/2006 | Komuro et al. |
| 6,998,940 B2 | 2/2006 | Metzger |
| 7,019,604 B2 | 3/2006 | Gotoh et al. |
| 7,019,605 B2 | 3/2006 | Larson et al. |
| 7,057,476 B2 | 6/2006 | Hwu |
| 7,084,553 B2 | 8/2006 | Ludwiczak |
| 7,091,649 B2 | 8/2006 | Larson |
| 7,098,758 B2 | 8/2006 | Wang et al. |
| 7,128,941 B2 | 10/2006 | Lee |
| 7,161,448 B2 | 1/2007 | Feng et al. |
| 7,170,215 B2 | 1/2007 | Namba et al. |
| 7,173,504 B2 | 2/2007 | Larson |
| 7,187,254 B2 | 3/2007 | Su et al. |
| 7,209,374 B2 | 4/2007 | Noro |
| 7,230,509 B2 | 6/2007 | Stoemmer |
| 7,281,304 B2 | 10/2007 | Kim et al. |
| 7,369,013 B2 | 5/2008 | Fazzio et al. |
| 2002/0000646 A1 | 1/2002 | Gooch et al. |
| 2002/0030424 A1 | 3/2002 | Iwata |
| 2002/0121944 A1 | 9/2002 | Larson, III et al. |
| 2002/0121945 A1 | 9/2002 | Ruby et al. |
| 2002/0152803 A1 | 10/2002 | Larson, III et al. |
| 2002/0190814 A1 | 12/2002 | Yamada et al. |
| 2003/0001251 A1 | 1/2003 | Cheever et al. |
| 2003/0006502 A1 | 1/2003 | Karpman |
| 2003/0051550 A1 | 3/2003 | Nguyen et al. |
| 2003/0087469 A1 | 5/2003 | Ma |
| 2003/0102776 A1 | 6/2003 | Takeda et al. |
| 2003/0111439 A1 | 6/2003 | Fetter et al. |
| 2003/0128081 A1 | 7/2003 | Ella et al. |
| 2003/0132493 A1 | 7/2003 | Kang et al. |
| 2003/0141946 A1 | 7/2003 | Ruby et al. |
| 2003/0179053 A1 | 9/2003 | Aigner et al. |
| 2004/0092234 A1 | 5/2004 | Pohjonen |
| 2004/0124952 A1 | 7/2004 | Tikka |
| 2004/0150293 A1 | 8/2004 | Unterberger |
| 2004/0150296 A1 | 8/2004 | Park et al. |
| 2004/0195937 A1 | 10/2004 | Matsubara et al. |
| 2004/0212458 A1 | 10/2004 | Lee |
| 2004/0257171 A1 | 12/2004 | Park et al. |
| 2004/0257172 A1 | 12/2004 | Schmidhammer et al. |
| 2004/0263287 A1 | 12/2004 | Ginsburg et al. |
| 2005/0012570 A1 | 1/2005 | Korden et al. |
| 2005/0023931 A1 | 2/2005 | Bouche et al. |
| 2005/0030126 A1 | 2/2005 | Inoue et al. |
| 2005/0036604 A1 | 2/2005 | Scott et al. |
| 2005/0057117 A1 | 3/2005 | Nakatsuka et al. |
| 2005/0057324 A1 | 3/2005 | Onishi et al. |
| 2005/0068124 A1 | 3/2005 | Stoemmer |
| 2005/0093396 A1 | 5/2005 | Larson et al. |
| 2005/0093653 A1 | 5/2005 | Larson, III |
| 2005/0093654 A1 | 5/2005 | Larson, III et al. |
| 2005/0093655 A1 | 5/2005 | Larson, III et al. |
| 2005/0093657 A1 | 5/2005 | Larson et al. |
| 2005/0093658 A1 | 5/2005 | Larson et al. |
| 2005/0093659 A1 | 5/2005 | Larson, III et al. |
| 2005/0104690 A1 | 5/2005 | Larson, III et al. |
| 2005/0110598 A1 | 5/2005 | Larson, III |
| 2005/0128030 A1 | 6/2005 | Larson et al. |
| 2005/0140466 A1 | 6/2005 | Larson, III et al. |
| 2005/0167795 A1 | 8/2005 | Higashi |
| 2005/0193507 A1 | 9/2005 | Ludwiczak |
| 2005/0206271 A1 | 9/2005 | Higuchi et al. |
| 2005/0218488 A1 | 10/2005 | Matsuo |
| 2006/0087199 A1 | 4/2006 | Larson et al. |
| 2006/0103492 A1 | 5/2006 | Feng et al. |
| 2006/0125489 A1 | 6/2006 | Feucht et al. |
| 2006/0132262 A1 | 6/2006 | Fazzlo et al. |
| 2006/0164183 A1 | 7/2006 | Tikka |
| 2006/0185139 A1 | 8/2006 | Larson, III et al. |
| 2006/0197411 A1 | 9/2006 | Hoen et al. |
| 2006/0238070 A1 * | 10/2006 | Costa et al. .................. 310/318 |
| 2007/0086080 A1 | 4/2007 | Larson et al. |
| 2007/0086274 A1 | 4/2007 | Nishimura et al. |
| 2007/0170815 A1 | 7/2007 | Unkrich |
| 2007/0171002 A1 | 7/2007 | Unkrich |

FOREIGN PATENT DOCUMENTS

| | | | |
|---|---|---|---|
| EP | 0 231 892 | * | 8/1987 |
| EP | 0 637 875 | * | 2/1995 |
| EP | 0689254 | | 6/1995 |
| EP | 0865157 | | 9/1998 |
| EP | 0880227 | | 11/1998 |
| EP | 0973256 | | 1/2000 |
| EP | 1047189 | | 10/2000 |
| EP | 1100196 | | 11/2000 |
| EP | 1096259 | | 5/2001 |
| EP | 1258990 | | 11/2002 |
| EP | 1180494 | | 3/2003 |
| EP | 1542362 | | 6/2003 |
| EP | 1258989 | | 1/2004 |
| EP | 1528674 | | 6/2004 |
| EP | 1528675 | | 6/2004 |
| EP | 1528677 | | 7/2004 |
| EP | 1249932 | | 3/2005 |
| EP | 1517443 | | 3/2005 |
| EP | 1517444 | | 3/2005 |
| EP | 1557945 | | 7/2005 |
| EP | 1575165 | | 9/2005 |
| GB | 1207974 | | 11/1967 |
| GB | 2411239 | | 8/2005 |
| GB | 2418791 | | 4/2006 |
| GB | 2427773 | | 1/2007 |
| JP | 61054686 | | 3/1986 |
| JP | 2002/217676 | | 8/2002 |
| WO | WO-98/16957 | | 4/1998 |
| WO | WO-01/06647 | | 1/2001 |
| WO | WO-01/99276 | | 12/2001 |
| WO | WO-02/103900 | | 12/2002 |
| WO | WO-03/030358 | | 4/2003 |
| WO | WO-03/043188 | | 5/2003 |
| WO | WO-03/050950 | | 6/2003 |
| WO | WO-03/058809 | | 7/2003 |
| WO | WO-2004/034579 | | 4/2004 |
| WO | WO-2004/051744 | | 6/2004 |
| WO | WO-2005/043752 | | 5/2005 |
| WO | WO-2005/043753 | | 5/2005 |
| WO | WO-2005/043756 | | 5/2005 |
| WO | WO-2006/018788 | | 2/2006 |

OTHER PUBLICATIONS

Larson III, J. D., et al., "Measurement of Effective Kt2q,RpRs vs. Temperature for Mo/AlN/Mo Resonators", *2002 IEEE Ultrasonics Symposium*, Munich, Germany, (Oct. 2002),915-919.

Aoyama, T. et al., "Diffusion of Boron, Phosphorous, Arsenic and Antimony in Thermally Grown SiliconDioxide", Fiujitsu Labs, *J. Electromechanical Soc.*, vol. 146, No. 5, (1999), 1879-1883.

Parker, T. E., et al., "Temperature-Compensated Surface Acoustic-Wave Devices with SiO2 Film Overlays", *J. Appl. Physics*, vol. 50, (1360-1369),Mar. 1979.

Tsubbouchi, K. et al., "Zero Temperature coefficient Surface Acoustic Wave Devices using Epitaxial AIN Films", *IEEE Ultrasonic symposium*, San Diaego, CA, 1082, (1982),240-245.

Lakin, K. M., "Thin Film Resonators and Filters", *IEEE Untrasonics Symposium*, Caesar's Tahoe, NV, (Oct. 1999),895-906.

Lakin, K. M., et al., "Temperature Compensated Bulk Acoustic Thin Film Resonators", *IEEE Ultrasonics Symposium*, San Juan, Puerto Rico, (Oct. 2000),855-858.

Ohta, S. et al., "Temperature Characteristics of Solidly Mounted Piezoelectric Thin Film Resonators", *IEEE Ultrasonics Symposium*, Honolulu, HI, (Oct. 2003),2011-2015.

Bauer, L. O., et al., "Properties of Silicon Implanted with Boron Ions through Thermal Silicon Dioxide", *Solid State Electronics*, vol. 16, No. 3, (Mar. 1973),289-300.

Topich, J. A., et al., "Effects of Ion Implanted Flourine in Silicon Dioxide", *Nuclear Instr. And Methods*, Cecon Rec, Cleveland, OH, (May 1978), 70-73.

Spangenberg, B. et al., "Dependence of the Layer Resistance of Boron Implantation in Silicon and the Annealing Conditions", *Comptus Rendus de l'Academic Bulgare des Sciences*, vol. 33, No. 3, (1980),325-327.

Hara, K. "Surface Treatment of Quartz Oscillator Plate by Ion Implantation", *Oyo Buturi*, vol. 47, No. 2, (Feb. 1978),145-146.

Ng, J. et al., "The Diffusion Ion-Implanted Boron in Silicon Dioxide", *AIP Conf. Proceedings*, No. 122, (1984),20-33.

Krishnaswamy, S.V. et al., "Film Bulk Acoustic Wave Resonator Technology", (May 29, 1990),529-536.

Lobl, H.P. et al., "Piezoelectric Materials For BAW Resonators And Filters", *2001 IEEE Ultrasonics Symposium*, (Jan. 1, 2001),807-811.

"Search Report for Great Britain Patent Application", No. 0617742.2, (Mar. 29, 2007).

Schuessler, Hans H., "Ceramic Filters and Resonators", *Reprinted from IEEE Trans. Sonics Ultrason.*, vol. SU-21, (Oct. 1974),257-268.

Fattinger, G. G., et al., "Coupled Bulk Acoustic Wave Resonator Filters: Key technology for single-to-balanced RF filters", 0-7803-8331-1/4/W20.00; *IEEE MTT-S Digest*, (2004),927-929.

Choi, Sungjin et al., "Design of Half-Bridge Piezo-Transformer Converters in the AC Adapter Applications", *IEEE 2005*, 244-248.

LI, Yunxiu et al., "AC-DC Converter with Worldwide Range Input Voltage by Series and Parallel Piezoelectric Transformer Connection", *35th Annual IEEE Power Electronics Specialists Conference*, (2004).

Ivensky, Gregory et al., "A Comparison of Piezoelectric Transformer AC/DC Converters with Current Doubler and voltage Doubler Rectifiers", *IEEE Transactions on Power Electronics*, vol. 19, No. 6., (Nov. 2004).

Navas, J. et al., "Miniaturised Battery Charger using Piezoelectric Transformers", *IEEE*, (2001),492-496.

Jiang, Yimin et al., "A Novel Single-Phase Power Factor Correction Scheme", *IEEE*, (1993),287-292.

"Search Report for Great Britain Patent Application", No. 0617742.2, (Dec. 13, 2006).

"Search Report from corresponding application", No. GB0605225.2, (Jun. 26, 2006).

Lakin, K.M. "Bulk Acoustic Wave Coupled Resonator Filters", *2002 IEEE International Frequency Control Symposium and PDA Exhibition*, (Jan. 2, 2002),8-14.

Holzlohner, Ronald et al., "Accurate Calculation of Eye Diagrams and Bit Error Rates in Optical Transmission Systems Using Linearization", *Journal of Lightwave Technology*, vol. 20, No. 3,, (Mar. 2002),pp. 389-400.

Reinhardt, Alexandre et al., "Design of Coupled Resonator Filters Using Admittance and Scattering Matrices", *2003 IEEE Ultrasonics Symposium*, (May 3, 2003),1428-1431.

Hadimioglu, B. et al., ""Polymer Films As Acoustic Matching Layers".", *1990 IEEE Ultrasonics Symposium Proceedings*, vol. 3 PP., Previously submitted as "Polymer Files As Acoustic Matching Layers, 1990 IEEE Ultrasonics Symposium Proceeding. vol. 4 pp. 1227-1340, Dec. 1990". Considered by Examiner on Mar. 20, 2007,(Dec. 1990), 1337-1340.

"Search Report from corresponding application No.", GB 0605779.8, (Aug. 23, 2006).

"Examination Report from UK for application", GB 0605971.1, (Aug. 24, 2006).

Lakin, K.M. "Coupled Resonator Filters", *2002 IEEE Ultrasonics Symposium*, (Mar. 2, 2002),901-908.

Lakin, K.M. et al., "High Performance Stacked Crystal Filters for GPS and Wide Bandwidth Applications", *2001 IEEE Ultrasonics Symposium*, (Jan. 1, 2001),833-838.

"Examination report corresponding to application No.", GB0605770.7, (Aug. 25, 2006).

"Examination Report corresponding to application No.", GB0605775.6, (Aug. 30, 2006).

"Search report from corresponding application No.", GB0620152.9, (Nov. 15, 2006).

"Search report from corresponding application No.", GB0620655.1, (Nov. 17, 2006).

"Search report from corresponding application No.", GB0620653.6, (Nov. 17, 2006).

"Search Report from corresponding application No.", GB0620657.7, (Nov. 23, 2006).

Coombs, Clyde F., et al., "Electronic Instrument Handbook", *Second Edition, McGraw-Hill, Inc.*, (1995),pp. 5.1 to 5.29.

"A partial copy of GB Search Report for", Application No. GB0522393.8, (Jan. 9, 2006),4 pages.

Jung, Jun-Phil et al., "Experimental And Theoretical Investigation On The Relationship Between AIN Properties And AIN-Based FBAR Characteristics", *2003 IEEE International Frequency Control Symposium and PDA Exhibition Jointly with the 17th European Frequency and Time Forum*, (Sep. 3, 2003),779-784.

Yang, C.M. et al., "Highly C Axis Oriented AIN Film Using MOCVD For 5GHx Band FBAR Filter", *2003 IEEE Ultrasonics Symposium*, (Oct. 5, 2003),pp. 170-173.

Auld, B. A., "Acoustic Resonators", *Acoustic Fields and Waves in Solids, Second Edition*, vol. II, (1990),250-259.

"Search Report in the Great Britian Patent Application", No. 0619698.4, (Nov. 30, 2006).

Ruby, R. et al., "The Effect of Perimeter Geometry on FBAR Resonator Electrical Performance", *Microwave Symposium Digest, 2005 IEEE MTT-S International*, (Jun. 12, 2005),217-221.

"A partial copy of GB Search Report for Application No.", GB0525884.3, (Feb. 2, 2006),4 pgs.

"British Search Report Application No.", 0605222.9, (Jul. 11, 2006).

Tiersten, H. F., et al., "An Analysis of Thiskness-Extensional Trapped Energy Resonant Device Structures with Rectangular Electrodes in the Piezoelectric Thin Film on Silicon Configuration", *J. Appl. Phys.* 54 (10), (Oct. 1983),5893-5910.

U.S. Appl. No. 10/971,169, filed Oct. 22, 2004, John D. Larson, III et al.

Martin et al., "Development of Low-Dielectric Constant Polymer for Fabrication of Integrated Circuit Interconnect", 12 Advanced Materials, 1769 (2000).

U.S. Appl. No. 11/253,464, filed Oct. 18, 2005, John D. Larson, III et al.

U.S. Appl. No. 11/253,851, filed Oct. 18, 2005, John D. Larson, III.

U.S. Appl. No. 11/253,508, filed Oct. 18, 2005, John D. Larson, III.

U.S. Appl. No. 11/253,463, filed Oct. 18, 2005, John D. Larson, III et al.

U.S. Appl. No. 11/252,444, filed Oct. 18, 2005, John D. Larson, III et al.

Sanchez, A.M. et al., "Mixed analytical and numerical design method for piezoelectric transformers", *IEEE,PESX*, (Jun. 2003),841-846.

\* cited by examiner

ACOUSTICALLY COMMUNICATING DATA SIGNALS ACROSS AN ELECTRICAL ISOLATION BARRIER

CROSS-REFERENCE TO RELATED APPLICATIONS

This application relates to U.S. patent application Ser. No. 10/971,169, filed Oct. 22, 2004, by John D. Larson, III et al. et al. and entitled "Piezoelectric Isolating Transformer," which is incorporated herein by reference.

BACKGROUND

An electrical isolation barrier (also referred to as a galvanic isolation barrier) is used to electrically isolate one electronic circuit from another electronic circuit. Two electronic circuits are considered to be electrically isolated when at most a threshold level of current flows in response to application of a voltage above a voltage threshold across any node of the first electronic circuit and any node of the second electronic circuit. In typical telecommunication applications, the current threshold is 10 milliamperes (mA) or less and the voltage threshold is 1000 volts (V) or more. Other applications, particularly those involving medical equipment impose much lower threshold current levels. Electrical isolation barriers are used in a wide variety of different applications, including separating measurement instruments from sensors operating in adverse environments, separating patients from high voltages present in measurement instruments, and separating circuitry that is connected directly to a residential power outlet from circuitry that is connected directly to the standard two-wire telephone network.

Data signals typically are communicated across an electrical isolation barrier using optical coupling, electrostatic coupling, or magnetic coupling. Acoustic coupling of data signals across large-scale ultrasonic coupling media such as the wall of an aircraft or rocket fuel tank have been proposed. The acoustic transducers that are used in these approaches are formed from bulk crystal resonators, which are large (e.g., 12.6 millimeters (mm) in diameter) and are limited to low-frequency and low-bandwidth applications (e.g., on the order of 1 Megahertz (MHz) or less). In addition, the manufacturing techniques that are used to fabricate such bulk crystal resonators typically cannot control the operating characteristics of these devices with tight tolerances What is needed is a low-cost, compact electrical isolation approach that is capable of high-frequency, high-bandwidth data transmission and is capable of being manufactured with tight operating characteristics tolerances. It additionally would be desirable if such an approach could be used to supply sufficient electrical power to operate auxiliary electronic circuits and components on the isolated side of the electrical isolation barrier.

SUMMARY

In one aspect, the invention features a system for communicating a data signal across an electrical isolation barrier. The system includes a modulator, an integrated acoustic data coupler, and a demodulator. The modulator is operable to modulate a carrier signal having a frequency in an operating frequency range in response to an input data signal and to provide the modulated carrier signal at a modulator output. The integrated acoustic data coupler includes an acoustically resonant structure that has one or more acoustic resonant frequencies in the operating frequency range. The acoustically resonant structure includes a first thin film electro-acoustic transducer electrically coupled to the modulator output, a second thin film electro-acoustic transducer, and a substrate. The substrate supports, acoustically couples, and provides an electrical isolation barrier between the first and second thin film electro-acoustic transducers. The demodulator has a demodulator input coupled to the second thin film electro-acoustic transducer and is operable to generate an output data signal from an input signal received at the demodulator input.

In another aspect, the invention features a method of communicating a data signal across an electrical isolation barrier. In accordance with this inventive method a carrier signal having frequency of at least 10 MHz is modulated in response to an input data signal. An input electrical signal corresponding to the modulated carrier signal is converted into acoustic energy. The acoustic energy is coupled across an electrical isolation barrier. The acoustic energy coupled across the electrical isolation barrier is converted into an output electrical signal. An output data signal is generated from the output electrical signal.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

The embodiments that are described in detail below include integrated acoustic data couplers that are capable providing an electrical isolation barrier between electronic circuits and devices, transmitting data at high frequencies (e.g., on the order of 1 GHz or higher), and are capable of being manufactured with tight operating characteristics tolerances. Some of these embodiments additionally include integrated acoustic power transformers that are capable of supplying sufficient electrical power to operate auxiliary electronic circuits and components on the isolated side of an electrical isolation barrier.

Figure 1:
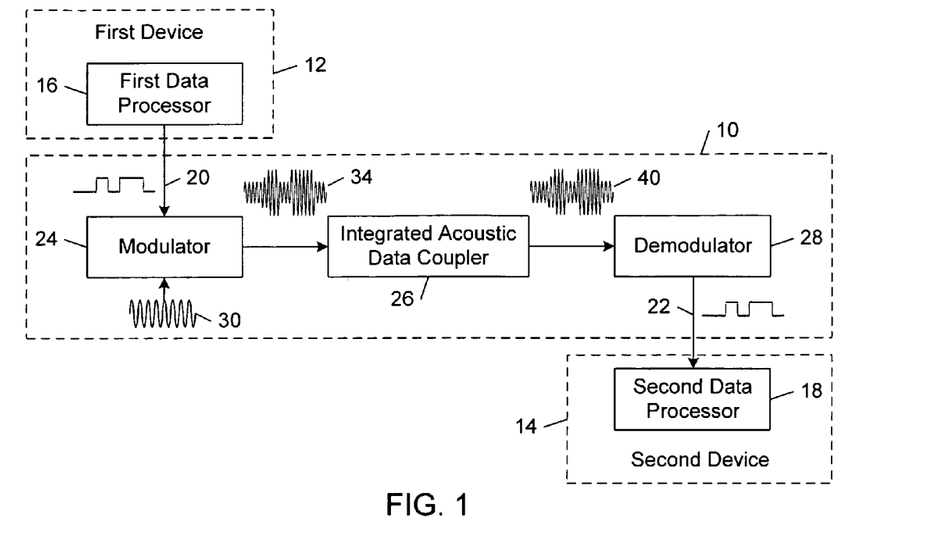
FIG. 1 is a block diagram of an embodiment of a data communication system that includes a modulator, an integrated acoustic data coupler, and a demodulator.

FIG. 1 shows an embodiment of a data communication system 10 that is coupled between a first device 12 and a second device 14. The first and second devices 12, 14 may be any type of devices or circuits that must be separated by an electrical isolation barrier. The first and second devices 12, 14 respectively include first and second data processors 16, 18 for sending and receiving data signals 20, 22. The data communication system 10 includes a modulator 24, an integrated acoustic data coupler 26, and a demodulator 28. The integrated acoustic data coupler 26 includes an electrical isolation barrier that electrically isolates the first and second devices 12, 14. The characteristics of the electrical isolation barrier are application-dependent. In some embodiments, the electrical isolation barrier allows a current of at most 10 mA to flow in response to application of a voltage of 1000 V across the grounded electrodes of a pair of electro-acoustic transducers on opposite sides of the electrical isolation barrier. Other embodiments impose a lower limit on the value of current that flows across the electrical isolation barrier in response to the application of the voltage. As explained in detail below, the integrated acoustic data coupler 26 conveys the data signal 20 from the first device 12 to the second device 14 across the electrical isolation barrier.

Figure 2:
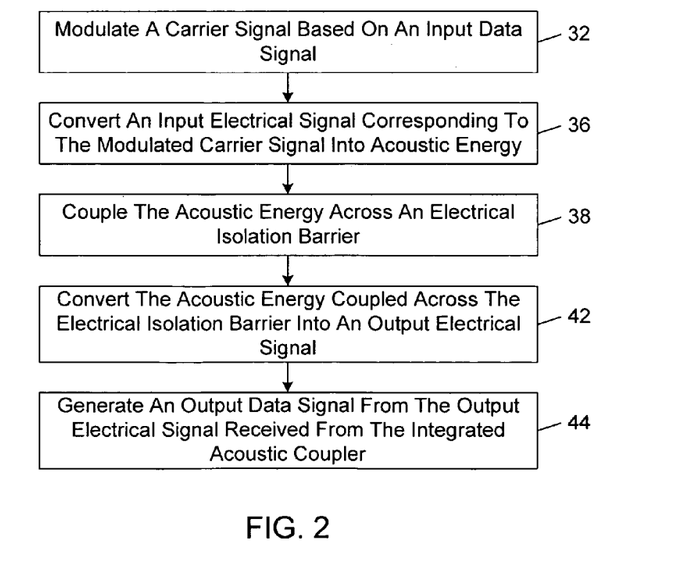
FIG. 2 is a flow diagram of an embodiment of a method of acoustically communicating data signals across and electrical isolation barrier.

FIG. 2 shows an embodiment of a method by which the data communication system 10 communicates data signals from the first device 12 to the second device 14. In accordance with this method, the modulator 24 modulates a carrier signal 30 based on the data signal 22 generated by the first data processor 16 (block 32). The modulator 24 may modulate the carrier signal 30 in accordance with one or more modulation techniques, including frequency modulation techniques, amplitude modulation techniques, and phase modulation techniques. A modulated carrier signal 34 is transmitted to the integrated data coupler 26. In some implementations, the modulated carrier signal 34 is amplified, filtered, or processed before being transmitted to the integrated acoustic data coupler 26. The integrated acoustic data coupler 26 converts the modulated carrier signal 34 into acoustic energy (block 36), couples the acoustic energy across an electrical isolation barrier (block 38), and converts the acoustic energy coupled across the electrical isolation barrier into an output electrical signal 40 (block 42). In some implementations, the output electrical signal 40 is amplified, filtered, or processed before being transmitted to the demodulator 28. The demodulator 28 generates the output data signal 22 from the output electrical signal 40 received from the integrated acoustic coupler 26 (block 44). The demodulator 28 may demodulate the original data signal 22 from the received output electrical data signal 40 in accordance with a complimentary demodulation technique that matches the modulation technique used by the modulator 24.

Figure 3:
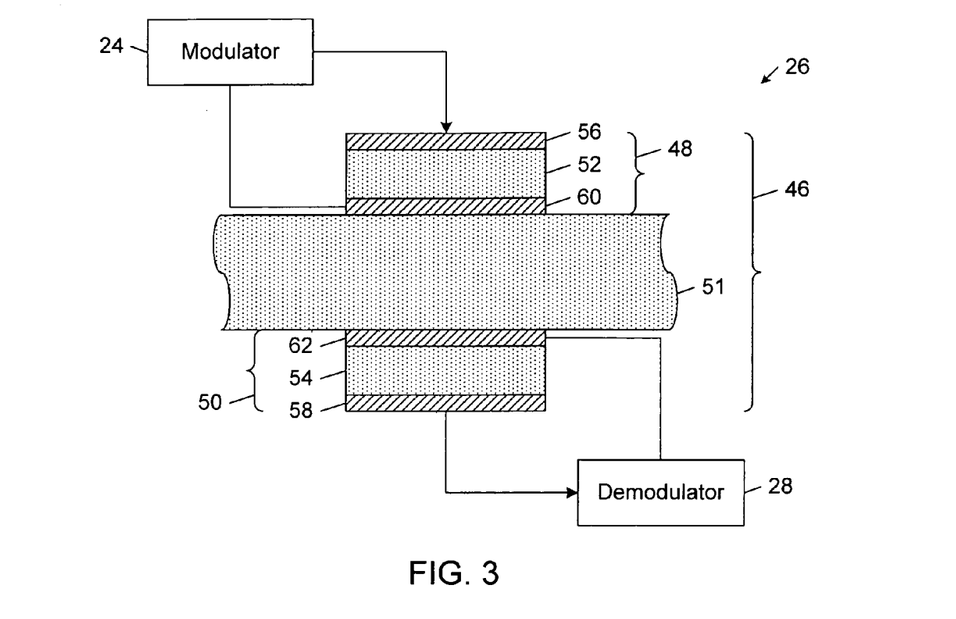
FIG. 3 is a diagrammatic sectional view of an embodiment of an integrated acoustic data coupler that is coupled between a modulator and a demodulator.

FIG. 3 shows an embodiment of the integrated acoustic data coupler 26 that includes an acoustically resonant structure 46 formed from a first thin film electro-acoustic transducer 48 and a second thin film electro-acoustic transducer 50 on opposite sides of a substrate 51.

In the illustrated embodiment, each of the thin film electro-acoustic transducers 48, 50 is formed from a respective thin film piezoelectric structure 52, 54 that is between a respective top electrode 56, 58 and a respective bottom electrode 60, 62. Each of the piezoelectric structures 52, 54 may be formed from one or more layers of piezoelectric material. The one or more piezoelectric layers may be formed of a wurtzite-type hexagonal crystal, such as cadmium sulfide, cadmium selenide, zinc oxide, beryllium oxide, aluminum nitride, and wurtzite zinc sulfide, and solid solutions thereof, and lead-zirconate-titanate (PZT). Alternatively, the one or more piezoelectric layers may be formed of a non-wurtzite-type hexagonal crystal piezoelectric material, such as a sphalerite cubic crystal. The top electrodes 56, 58 and the bottom electrodes 60, 62 may be formed from one or more layers of Mo, Al, Au, Pt, Ti, and alloys thereof. Each of the thin film electro-acoustic transducers 48, 50 may be fabricated using one or more thin film deposition techniques, photolithographic techniques, and micro-machining techniques.

The substrate 51 may be formed of alumina, glass, ceramic, sapphire or one or more of any number of electrically-insulating materials. Alternatively, the substrate 51 may be composed of a material that is at least partially electrically conducting and at least one electrically insulating layer. For example, in some embodiments, the substrate is formed of a high-resistivity silicon substrate supporting one or more electrically insulating layers formed of a dielectric material, such as silicon dioxide or silicon nitride. The substrate 51 electrically insulates the first thin film electro-acoustic transducer 48 from the second thin film electro-acoustic transducer 50. In some embodiments, the substrate 51 provides an electrical isolation barrier that allows a current of at most 10 mA to flow in response to application of a voltage of 1000 V across the bottom ground electrodes 60, 62. In some embodiments, the substrate 51 has a thickness normal to surfaces of the substrate respectively supporting the first and second thin film electro-acoustic transducers 48, 50 in a range from 0.1 μm to 1000 μm.

In general, the resonant frequencies of the first and second thin film electro-acoustic transducers 48, 50 are determined primarily by the thicknesses of the piezoelectric structures 52, 54 and secondarily by the thicknesses and the material compositions of the other layers. The acoustically resonant structure 46 is characterized by at least one mechanical resonant frequency corresponding to the frequency at which the half wavelength (or integer multiples of a half wavelength) of a sound wave propagating in the acoustically resonant structure 46 is approximately equal to the total thickness of the acoustically resonant structure 46. In some embodiments, the thicknesses and compositions of the constituent layers of the first and second thin film electro-acoustic transducers 48, 50 and the substrate 51 are selected so that the acoustically resonant structure 46 has a fundamental resonant frequency that substantially coincides with a specified target frequency of the carrier signal 30 (i.e., within a range of 99% to 101% of the carrier signal frequency) and a bandwidth that encompasses the range of frequencies of the modulated carrier signal 34. In some embodiments, the first and second thin film electro-acoustic transducers 48, 50 are constructed and arranged to have quality factor values (or Q-values) that are lower than the Q-value of the acoustically resonant structure 46 as a whole. The Q-value measures the ratio between the stored energy and lost energy in an acoustic resonator. The Q-value of a resonator is greatly affected by the quality of the deposited electrodes and the piezoelectric layers.

The operating frequency band of the integrated acoustic data coupler 26 typically lies in the range from 10 MHz to several GHz, or greater, depending on the desired size of the integrated acoustic data coupler 26 and the passband characteristics of the electrically isolating substrate 51. For typical applications, the integrated acoustic data coupler 26 can be implemented in a die area that ranges from 50 μm×50 μm to 5000 μm×5000 μm. The nature of the integrated acoustic data coupler 26 allows it to be fabricated using high-volume integrated circuit fabrication methods, which provide tight control of the operating characteristics of the integrated acoustic data coupler 26. In addition, some embodiments of the integrated acoustic data coupler 26 may be manufactured on the same substrates (e.g., silicon substrates) with other integrated circuit elements (e.g., CMOS circuits and devices). These features of the integrated acoustic data coupler 26 significantly lower the manufacturing costs relative to other types of non-integrated electrically isolating data couplers.

As explained above, the data signal 20 that is generated by the first data processor 16 may be imposed on the carrier signal 30 in a wide variety of different ways.

Figure 4:
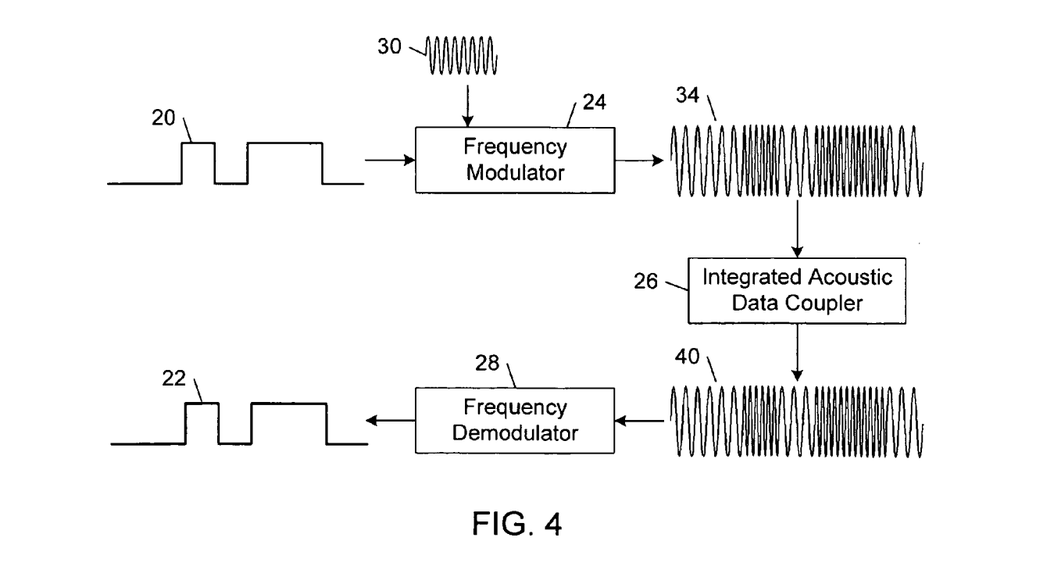
FIG. 4 is a diagrammatic view of an embodiment of a data communication system that includes a frequency modulator and a frequency demodulator.

FIG. 4 shows an implementation of the data communication system 10 in which the modulator 24 is implemented by a frequency modulator and the demodulator 28 is implemented by a frequency demodulator. The frequency modulator 24 changes the frequency of the carrier signal 30 based on the value of the data signal 20. In the illustrated example, the data signal 20 can have one of two binary values and the modulated carrier signal 34 has a first frequency that represents the first binary value and a second frequency that represents the second binary value. The frequency modulator 24 may by implemented by any one of a wide variety of different frequency modulator circuits, including a varactor-based frequency modulation circuit, a phase-locked loop (PLL) based frequency modulator circuit, and a vector modulator circuit. The frequency demodulator 28 generates the output data signal 22 by detecting the frequencies of the output electrical signal 40 received from the integrated acoustic coupler 26. The frequency demodulator 28 may be implemented by a wide variety of different frequency demodulator circuits, including a quadrature mixer based frequency modulation detection circuit and a PLL discriminator based frequency modulation detection circuit.

Figure 5:
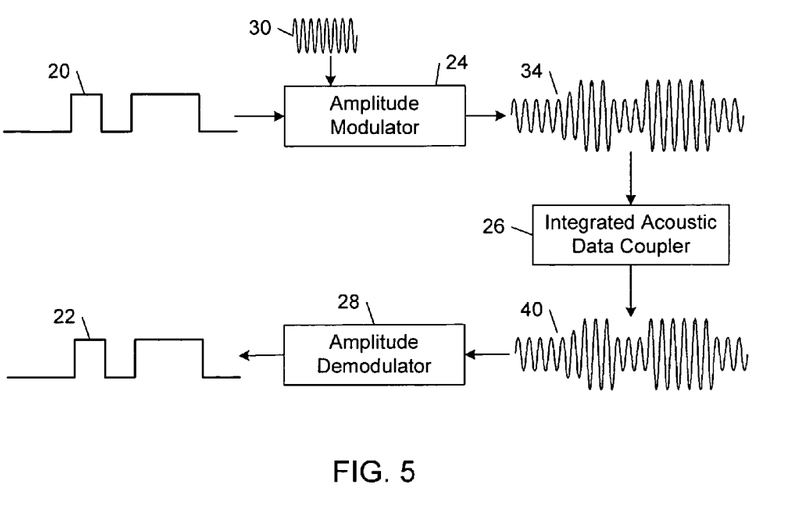
FIG. 5 is a diagrammatic view of an embodiment of a data communication system that includes an amplitude modulator and an amplitude demodulator.

FIG. 5 shows an implementation of the data communication system 10 in which the modulator 24 is implemented by an amplitude modulator and the demodulator 28 is implemented by an amplitude demodulator. The amplitude modulator 24 changes the amplitude of the carrier signal 30 based on the value of the data signal 20. In the illustrated example, the data signal 20 can have one of two binary values and the modulated carrier signal 34 has a first amplitude that represents the first binary value and a second amplitude that represents the second binary value. The amplitude modulator 24 may by implemented by any one of a wide variety of different amplitude modulator circuits, including an on-off-keying based amplitude modulation circuit and a mixer based amplitude modulation circuit that imposes a pre-shaped data signal onto a fixed amplitude carrier signal 30 based on the values of the data signal 20. The amplitude demodulator 28 generates the output data signal 22 by detecting the amplitudes of the output electrical signal 40 received from the integrated acoustic coupler 26. The amplitude demodulator 28 may be implemented by a wide variety of different amplitude demodulator circuits, including an amplitude modulation envelope detector circuit and an amplitude modulation coherent detector circuit.

Figure 6:
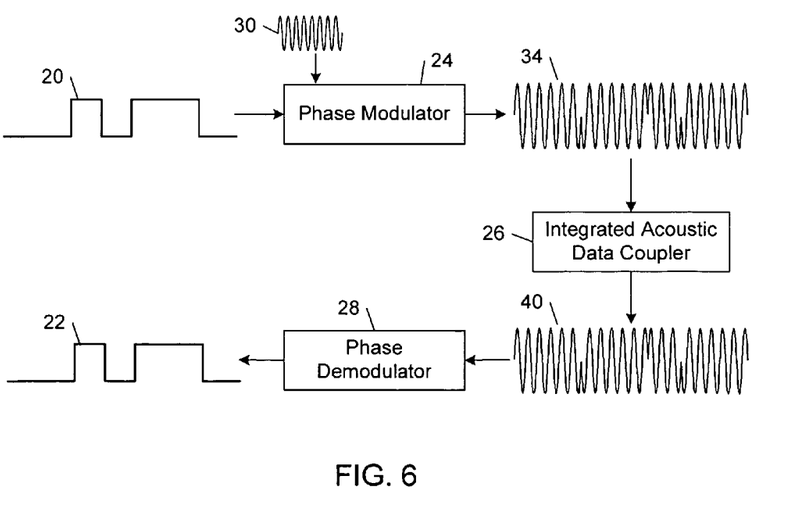
FIG. 6 is a diagrammatic view of an embodiment of a data communication system that includes a phase modulator and a phase demodulator.

FIG. 6 shows an implementation of the data communication system of 10 in which the modulator 24 is implemented by a phase modulator and the demodulator 28 is implemented by a phase demodulator. The phase modulator 24 changes the phase of the carrier signal 30 based on the value of the data signal 20. In the illustrated example, the data signal 20 can have one of two binary values and the modulated carrier signal 34 has a first phase that represents the first binary value and a second phase that represents the second binary value. The phase modulator 24 may by implemented by any one of a wide variety of different amplitude modulator circuits, including a circuit that includes an integrator that receives the data signal 20 and a frequency modulator that receives the output of the integrator. The phase demodulator 28 generates the output data signal 22 by detecting the phases of the output electrical signal 40 received from the integrated acoustic coupler 26. The phase demodulator 28 may be implemented by a wide variety of different phase demodulator circuits, including a re-modulation type of phase synchronization circuit.

Figure 7:
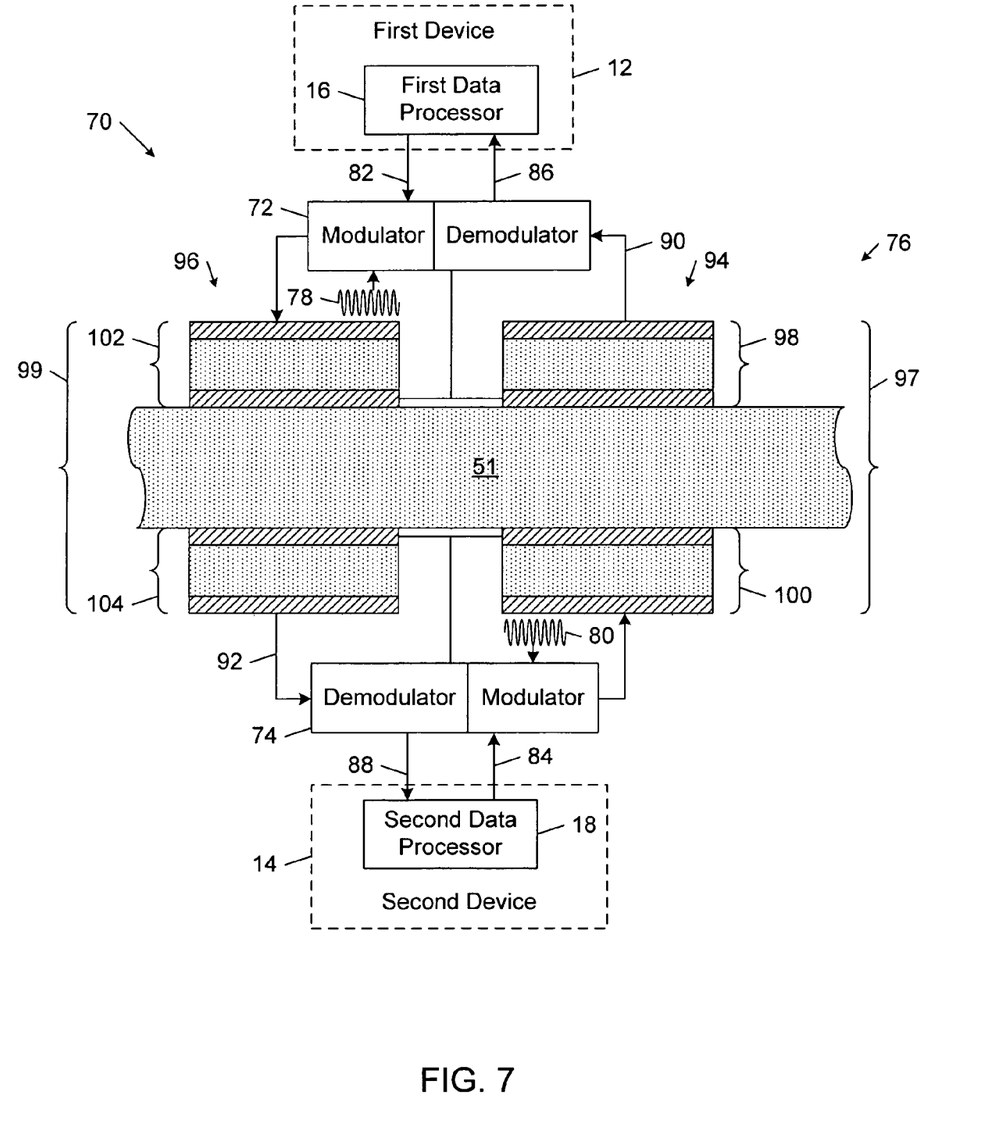
FIG. 7 is a diagrammatic view of an embodiment of a data communication system that is capable of bidirectional communication across an electrical isolation barrier.

FIG. 7 shows an embodiment of a data communication system 70 that is capable of bidirectional data communication across an electrical isolation barrier. The data communication system 70 includes a first modulator/demodulator (or "modem") 72, a second modulator/demodulator 74, and an electrically isolating acoustic transformer 76. Each of the modulators modulates a respective carrier signal 78, 80 based on a respective input data signal 82, 84 received from a respective one of the first and second devices 12, 14. Each of the demodulators generates a respective output data signal 86, 88 from a respective input signal 90, 92 received from the acoustic transformer 76.

The acoustic transformer 76 includes a first acoustic data coupler 94 and a second acoustic data coupler 96. Each of the first and second acoustic data couplers 94 and 96 includes a respective acoustically resonant structure 97, 99 that includes a respective pair of electro-acoustic transducers 98, 100 and 102, 104 on opposite sides of the substrate 51. Each of the electro-acoustic transducers 98-104 may be any type of acoustic resonator, including Bulk Acoustic Wave (BAW) resonators that are formed from one or more piezoelectric layers disposed between two electrodes. In the exemplary implementation shown in FIG. 7, each of the electro-acoustic transducers 98-104 is formed from a respective thin film piezoelectric structure that is between a respective top electrode and a respective bottom electrode in the manner described above in connection with the electro-acoustic transducers 48, 50 shown in FIG. 3.

The acoustically resonant structures 97, 99 have respective fundamental acoustic resonant frequencies that may be the same or different. The selection of the fundamental acoustic resonant frequencies of the acoustically resonant structures 97, 99 may depend on a number of factors, including the lateral separation between the acoustically resonant structures 97, 99, the material compositions of the components of the acoustically resonant structures 97, 99, and the type of modulation that is used to transmit the data signals 82, 84 across the electrical isolation barrier. The thicknesses and material compositions of the constituent layers of the acoustically resonant structures 97, 99 are selected so that the acoustically resonant structures 97, 99 have the selected fundamental acoustic resonant frequencies.

Figure 8:
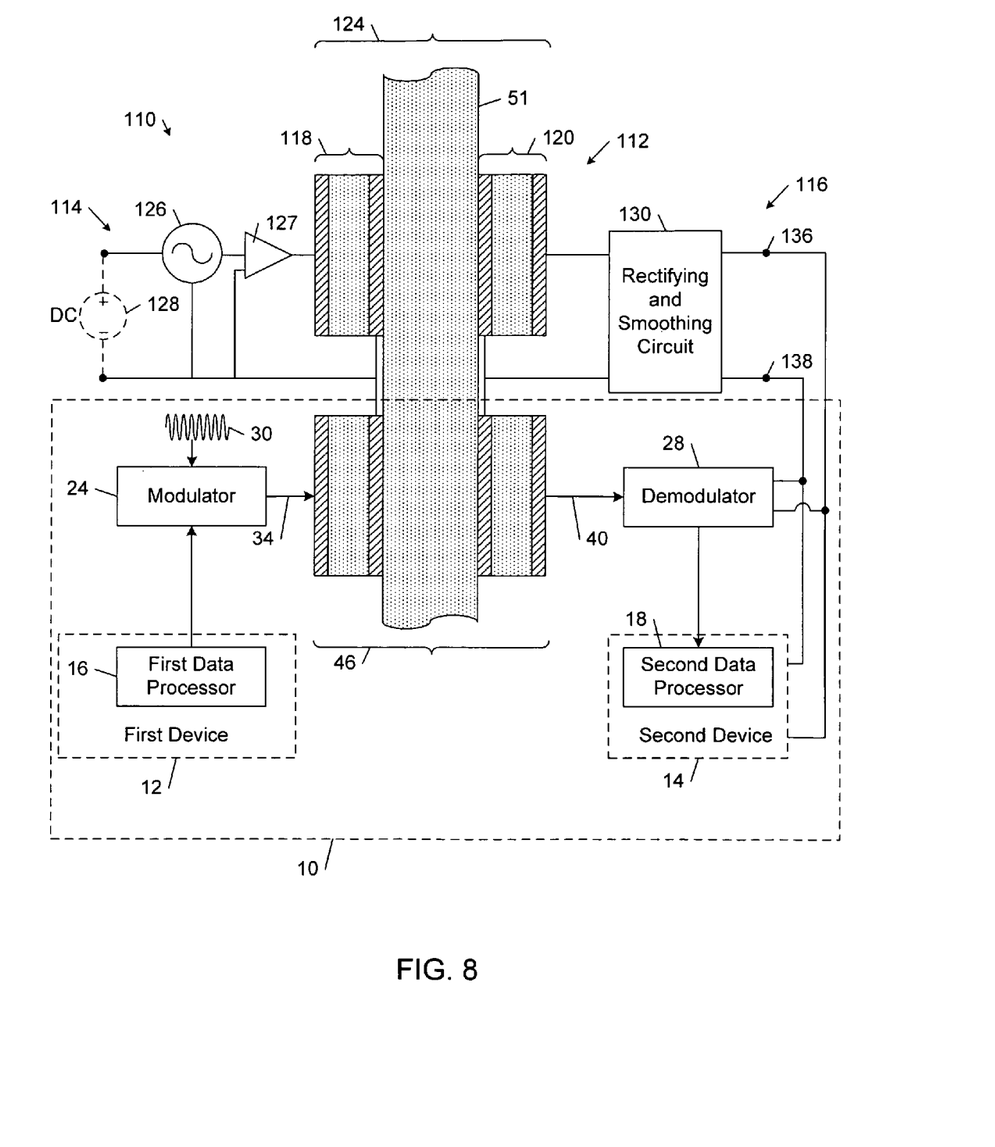
FIG. 8 is a diagrammatic view of an embodiment of a data communication system that includes an acoustic power transformer for transmitting power from one side of an electrical isolation barrier to the other side of the electrical isolation barrier.

FIG. 8 shows an embodiment of a data communication system 110 that includes the acoustic data coupler 10 shown in FIG. 1 integrated with an acoustic power transformer 112 on the substrate 51. The acoustic power transformer 112 transmits electrical power from a power source circuit 114, across the electrical isolation barrier provided by the substrate 51, to a power extraction circuit 116.

The acoustic power transformer 112 includes a pair of electro-acoustic transducers 118, 120 on opposite sides of the substrate 51. Each of the electro-acoustic transducers 118, 120 may be any type of acoustic resonator, including Bulk Acoustic Wave (BAW) resonators that are formed from one or more piezoelectric layers disposed between two electrodes. In the exemplary implementation shown in FIG. 8, each of the electro-acoustic transducers 118, 120 is formed from a respective thin film piezoelectric structure that is between a respective top electrode and a respective bottom electrode in the manner described above in connection with the electro-acoustic transducers 48, 50 shown in FIG. 3.

The acoustically resonant structures 46, 124 of the acoustic data coupler 26 and the acoustic power transformer 112 have respective fundamental acoustic resonant frequencies that may be the same or different. The selection of the fundamental acoustic resonant frequencies of the acoustically resonant structures 46, 124 may depend on a number of factors, including the frequency-dependence of the coupling efficiency of the power and data signals across the electrical isolation barrier, the lateral separation between the acoustically resonant structures 46, 124, the material compositions of the components of the acoustically resonant structures 46, 124, and the type of modulation that is used to transmit the data signal 20 across the electrical isolation barrier. The thicknesses and material compositions of the constituent layers of the acoustically resonant structures 46, 124 are selected so that the acoustically resonant structures 46, 124 have the selected fundamental acoustic resonant frequencies.

The power source circuit 114 includes an oscillator 126 and an amplifier 127. The oscillator 126 has an input that is coupled across the terminals of a direct current (DC) power source 128 and an output that is coupled across the input terminals of the amplifier 127. The output of the amplifier 127 is coupled to the input electrode of the electro-acoustic transducer 118. The power extraction circuit 116 includes a rectifying and smoothing circuit 130 with an input that is coupled across the electrodes of the electro-acoustic transducer 120 and an output that supplies DC power to the demodulator 28 and the second device 14. In operation, the oscillator 126 converts the input DC power received from the DC power source 128 into alternating current (AC) power. The amplifier 127 amplifies the AC power from the oscillator 126 and drives the electro-acoustic transducer 118 with amplified input AC power. The acoustic power transformer 112 acoustically couples the input AC power from the output of the power source circuit 114, across the electrical isolation barrier provided by the substrate 51, to the input of the power extraction circuit 116. The rectifying and smoothing circuit 130 rectifies the AC power received from the acoustic power transformer 112 to produce unfiltered DC power and then filters the unfiltered DC power to provide output DC power at the output terminals 136, 138, which are connected to the demodulator 28 and the second device 14.

In addition to the acoustic power transformer 112, the power source circuit 114, and the power extraction circuit 116, the data communication system 110 may include a feedback control circuit (not shown) that is configured to control the frequency of the input AC power in a manner that allows constant DC power to be delivered to the load 134 notwithstanding variations caused by variations in temperature and load current. Details regarding the structure and operation of the feedback control circuit may be obtained from co-pending U.S. patent application Ser. No. 10/971,169, filed Oct. 22, 2004, by John D. Larson, III et al. et al. and entitled "Piezoelectric Isolating Transformer."

Figure 9A:
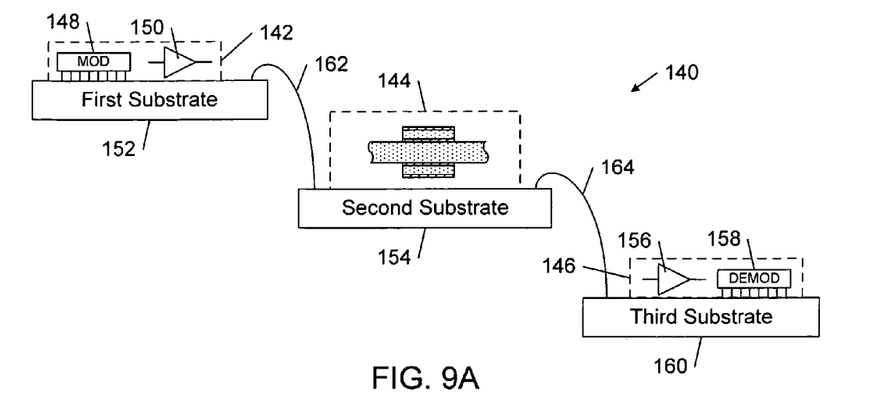
FIG. 9A shows a diagrammatic view of an embodiment of a data communication system in which a transmission circuit is mounted on a first substrate, an integrated acoustic data coupler is mounted on a second substrate, and a receiver circuit is mounted on a third substrate.

FIG. 9A shows an embodiment of a data communication system 140 that includes a transmission circuit 142, an acoustic coupler 144, and a receiver circuit 146. The transmission circuit 142 includes a modulator 148 and an amplifier 150 that are mounted on a first substrate 152 (e.g., a circuit board). The modulator 148 may be implemented in the same way as the modulator 24 that is described above and shown in FIG. 3. The acoustic coupler 144 is mounted on a second substrate 154 (e.g., a circuit board). The acoustic coupler 144 provides an electrical isolation barrier between the respective components of the transmission and receiver circuits 142, 146 while enabling unidirectional or bidirectional data communication across the electrical isolation barrier. The acoustic coupler 144 may include one or more of the acoustic coupling structures 46, 97, 99, and 124 that are described above and shown in FIGS. 3, 7, and 8. The receiver circuit 146 includes an amplifier 156 and a demodulator 158 that are mounted on a third substrate 160 (e.g., a circuit board). An electrical connection 162 electrically interconnects the components of the first substrate 152 to components on one side of the electrical isolation barrier, and an electrical connection 164 electrically interconnects the components of the third substrate 160 to components on a second side of the electrical isolation barrier. The first and third substrates 152, 160 do not share the same electrical ground and therefore are galvanically isolated from each other.

Figure 9B:
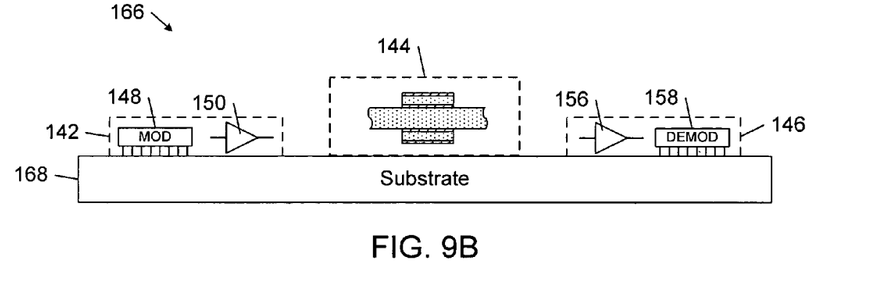
FIG. 9B shows a diagrammatic view of an embodiment of a data communication system in which a transmission circuit, an integrated acoustic data coupler, and a receiver circuit are mounted on the same substrate.

FIG. 9B shows an embodiment of a data communication system 166 that corresponds to the data communication system 140 shown in FIG. 9A, except that the transmission circuit 142, the acoustic coupler 144, and the receiver circuit 146 are mounted on the same substrate 168.

Figure 10:
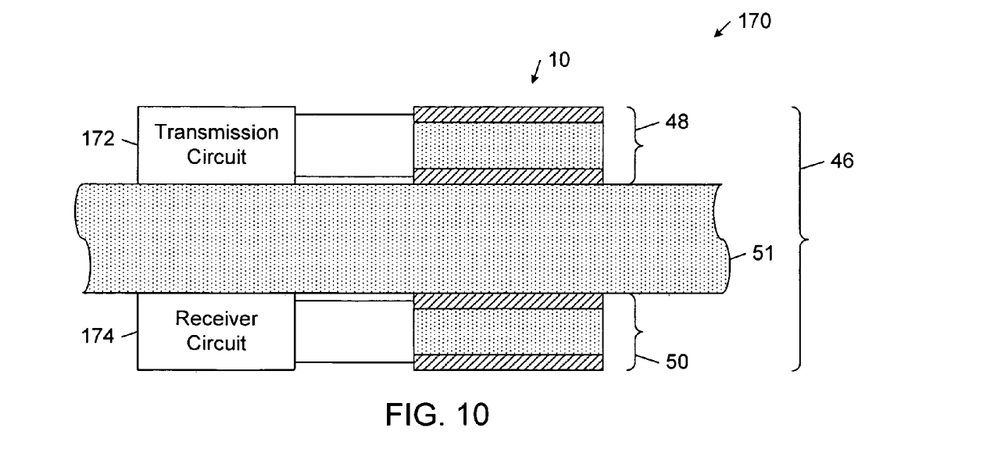
FIG. 10 shows a diagrammatic view of an embodiment of a data communication system in which a transmission circuit and a receiver circuit are integrated on opposite sides of the same substrate with an acoustic data coupler.

FIG. 10 shows an embodiment of a data communication system 170 in which a transmission circuit 172 and a receiver circuit 174 are integrated on the same substrate 51 with the acoustic data coupler 10. In this embodiment, the transmission circuit 172 and the receiver circuit 174 are integrated laterally with the electro-acoustic transducers of the acoustic data coupler 10 across the opposite surfaces of the substrate 51. In other embodiments, the transmission circuit 172 and the receiver circuit 174 are formed on the same side of the substrate 51. In some embodiments, the electro-acoustic transducers are integrated vertically (i.e., in a direction substantially parallel to the acoustic wave propagation direction through the substrate 51) with the transmission and receiver circuits 172, 174 in a single monolithic device.

The transmission circuit 172 and the receiver circuit 174 may be formed using known electronic circuit fabrication processes (e.g., CMOS fabrication processes) and the electro-acoustic transducers 48, 50 may be formed using known thin film deposition and patterning techniques. In general, the processes for forming the electronic circuitry of the transmission and receiver circuits 172, 174 should be isolated with respect to thermal gradients and contaminants from any incompatible processes that are used to fabricate the thin film electro-acoustic transducers 48, 50.

In embodiments in which the transmission and receiver circuits 172, 174 are integrated with the acoustic data coupler 10, the distances over which signals must travel between the electro-acoustic transducers 48, 50 and the electronic circuitry are significantly shorter and the number of connections is significantly fewer than in non-integrated devices in which the transmission circuit 172, the receiver circuit 174, and the acoustic data coupler 10 are implemented by separate components. As a result, the performance and sensitivity of these embodiments are significantly higher. In addition, these embodiments may be implemented by monolithic devices that are typically smaller than non-integrated devices, and are characterized by higher manufacturing reliability and lower manufacturing costs.

Figure 11:
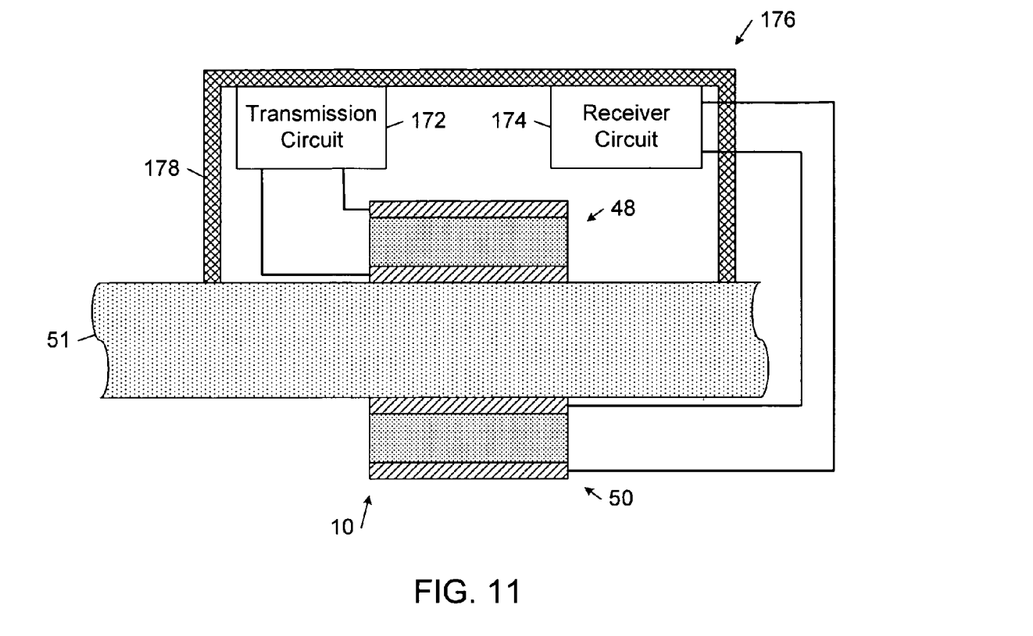
FIG. 11 shows a diagrammatic view of an embodiment of a data communication system in which a transmission circuit and a receiver circuit are integrated on one side of a substrate supporting an acoustic data coupler.

FIG. 11 shows an embodiment of a data communication system 176 that corresponds to the data communication system 170 shown in FIG. 10, except that the transmission and receiver circuits 172, 174 are formed on an inner surface of a cap structure 178 facing one side of the substrate 51, as described, for example, in U.S. Patent Application Publication No. 2005/0093659. The cap structure 178 seals and protects the electro-acoustic transducer 178, as described, for example, in U.S. Patent Application Publication No. 2005/0109455. The cap structure 178 also provides contacts that are connected electrically to the electro-acoustic transducers 48, 50 and the transmission and receiver circuits 172, 174. The cap structure 178 may be formed of a substrate (e.g., a wafer of semiconductor material, such as silicon) that may be bonded to the substrate 51 using a metal bond or using a non-metal bond material, such as benzocyclobutene (BCB), polyimide, or an amorphous fluorocarbon polymer (e.g., CYTOP®). The cap structure 178 includes a bottom side with a recess that defines a top part of the cavity containing the electro-acoustic transducer 48, and a top side that has vias through which the external contacts extend to the electrodes of the electro-acoustic transducer 48. The electrical contacts for the receiver circuit 174 may be connected electrically to the electro-acoustic transducer 50 by metal traces extending through the substrate 51 or by metal traces that extend over the side edges of the substrate 51.

Figure 12:
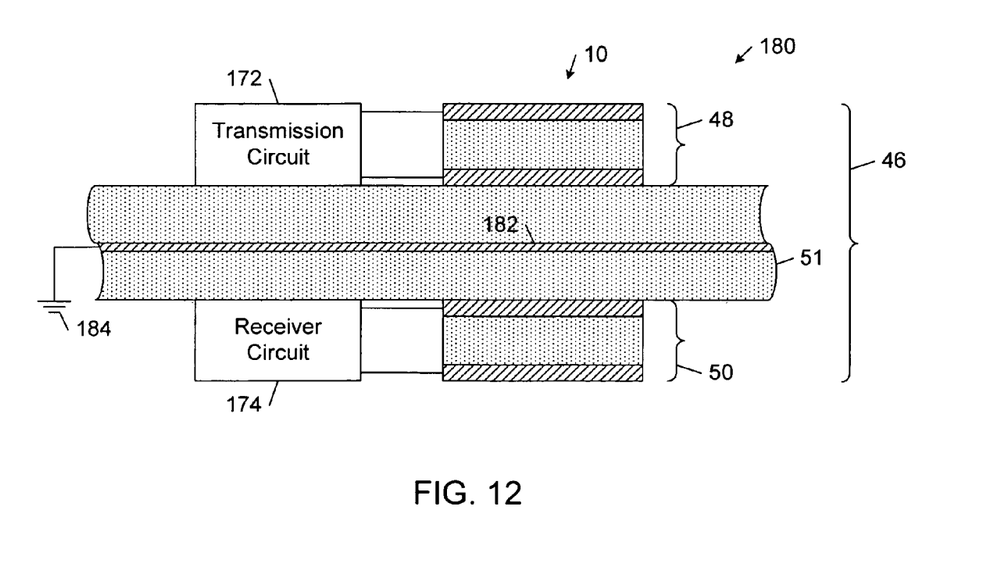
FIG. 12 shows a diagrammatic view of an embodiment of a data communication system that includes an acoustic data coupler that has an electrical isolation barrier with an integral grounded electrode.

FIG. 12 shows an embodiment of a data communication system 180 that corresponds to the data communication system 170 shown in FIG. 10, except that the data communication system 180 additionally includes an electrode 182 that is integrated in the substrate 51. The electrode 182 is electrically connected to a ground 184 that is electrically isolated from the ground paths of the electro-acoustic transducers 48, 50, the transmission circuit 172, and the receiver circuit 174. In this way, the electrode 182 provides an electrostatic shield that reduces electrostatic coupling between the electro-acoustic transducers 48, 50 and between other electrical components on opposite sides of the substrate 51.

Other embodiments are within the scope of the claims.

What is claimed is:

1. A system for communicating a data signal across an electrical isolation barrier, the system comprising:
a modulator operable to modulate a carrier signal having a frequency in an operating frequency range in response to an input data signal;
an integrated acoustic data coupler comprising an acoustically resonant structure having at least one acoustic resonant frequency in the operating frequency range, the acoustically resonant structure comprising:
a first thin film electro-acoustic transducer electrically coupled to an output of the modulator to receive the modulated carrier signal,
a second thin film electro-acoustic transducer, and
a substrate for acoustically coupling and providing an electrical isolation barrier between the first and second thin film electro-acoustic transducers; and
a demodulator operable to generate an output data signal from a signal received from the second thin film electro-acoustic transducer,
wherein the integrated acoustic data coupler draws a current of at most 10 mA when 1,000 V is applied across the integrated acoustic data coupler.

2. The system of claim 1, wherein the operating frequency range has a lower bound of 10 MHz.

3. The system of claim 1, wherein the acoustically resonant structure has a fundamental resonant frequency in a range of 99% to 101% of the frequency of the carrier signal.

4. The system of claim 1, wherein the substrate comprises electrically insulating material between the first and second thin film electro-acoustic transducers.

5. The system of claim 1, wherein the modulator and the first thin film electro-acoustic transducer are on a first side of the substrate, and the demodulator and the second thin film electro-acoustic transducer are on a second side of the substrate opposite the first side.

6. The system of claim 1, further comprising a first electrical ground path between the first thin film electro-acoustic transducer and the modulator and a second electrical ground path between the second thin film electro-acoustic transducer and the demodulator, wherein the first and second electrical ground paths are disconnected electrically from each other.

7. The system of claim 6, further comprising a third electrical ground path between the first and second electrical ground paths, wherein the third electrical ground path is electrically isolated from both the first and second electrical ground paths.

8. The system of claim 1, wherein each of the first and second thin film electro-acoustic transducers comprises a layer of piezoelectric material between a first electrode and a second electrode.

9. The system of claim 1, wherein the substrate has a thickness normal to surfaces of the substrate respectively supporting the first and second thin film electro-acoustic transducers in a range from 0.1 μm to 1000 μm.

10. The system of claim 1, wherein each of the first and second thin film electro-acoustic transducers has at least one respective lateral dimension in a plane parallel to a surface of the substrate supporting the respective thin film electro-acoustic transducer that is in a range from 50 μm to 5000 μm.

11. The system of claim 1, further comprising:
an oscillator operable to generate an input AC electrical power signal at a frequency within the operating frequency range;
a third thin film electro-acoustic transducer and a fourth thin film electro-acoustic transducer on opposite sides of the substrate, wherein the third thin film electro-acoustic transducer converts the input AC electrical power signal into acoustic energy that is coupled across the substrate and is converted by the fourth thin film electro-acoustic transducer into an output AC electrical power signal; and
a rectifying circuit coupled to the fourth thin film electro-acoustic transducer and operable to convert the output AC electrical power signal into DC electrical power.

12. The system of claim 1, wherein the modulator comprises a frequency modulator that modulates the frequency of the carrier signal in response to the input data signal, and
wherein the demodulator comprises a frequency modulation detector that generates the output data signal with logic levels responsive to frequency variations in the signal received by the demodulator.

13. The system of claim 1, wherein the modulator comprises an amplitude modulator that modulates the amplitude of the carrier signal in response to the input data signal, and
wherein the demodulator comprises an amplitude modulation detector that generates the output data signal with logic levels responsive to amplitude variations in the signal received by the demodulator.

14. The system of claim 1, wherein the modulator comprises a phase modulator that modulates the phase of the carrier signal in response to the input data signal, and
wherein the demodulator comprises a phase modulation detector that generates the output data signal with logic levels responsive to phase variations in the signal received by the demodulator.

15. A system for communicating a data signal across an electrical isolation barrier, the system comprising:
a modulator for modulating a carrier signal, having a frequency in an operating frequency range, in response to an input data signal;
an integrated acoustic data coupler comprising an acoustically resonant structure having at least one acoustic resonant frequency in the operating frequency range, the acoustically resonant structure comprising:
a first thin film electro-acoustic transducer electrically coupled to an output of the modulator,
a second thin film electro-acoustic transducer, and
a substrate acoustically coupling and providing an electrical isolation barrier between the first and second thin film electro-acoustic transducers;
a demodulator, coupled to the second thin film electro-acoustic transducer, for generating an output data signal from a signal received from the second thin film electro-acoustic transducer;
a first amplifier coupled between the modulator and the integrated acoustic data coupler and operable to amplify the modulated carrier signal; and
a second amplifier coupled between the demodulator and the integrated acoustic data output and operable to amplify the signal output by the second thin film electro-acoustic transducer.

16. The system of claim 15, wherein the modulator comprises an amplitude modulator that modulates the amplitude of the carrier signal in response to the input data signal, and
wherein the demodulator comprises an amplitude modulation detector that generates the output data signal with logic levels responsive to amplitude variations in the signal received by the demodulator.

17. The system of claim 15, wherein the modulator comprises a phase modulator that modulates the phase of the carrier signal in response to the input data signal, and
wherein the demodulator comprises a phase modulation detector that generates the output data signal with logic levels responsive to phase variations in the signal received by the demodulator.

18. The system of claim 15, wherein the modulator comprises a frequency modulator that modulates the frequency of the carrier signal in response to the input data signal, and
wherein the demodulator comprises a frequency modulation detector that generates the output data signal with logic levels responsive to frequency variations in the signal received by the demodulator.

19. A method of communicating a data signal across an electrical isolation barrier, comprising:
modulating a carrier signal having frequency of at least 10 MHz in response to an input data signal and amplifying the modulated carrier signal;
converting an input electrical signal corresponding to the amplified modulated carrier signal into acoustic energy;
coupling the acoustic energy across an electrical isolation barrier;
converting the acoustic energy coupled across the electrical isolation barrier into an output electrical signal and amplifying the output electrical signal; and
generating an output data signal from the amplified output electrical signal.

20. A system for communicating a data signal across an electrical isolation barrier, the system comprising:
a modulator mounted on a first substrate, the modulator configured to modulate a carrier signal having a frequency in an operating frequency range in response to an input data signal;
an integrated acoustic data coupler mounted on a second substrate, the integrated acoustic data coupler comprising an acoustically resonant structure having at least one acoustic resonant frequency in the operating frequency range, the acoustically resonant structure comprising:
a first thin film electro-acoustic transducer electrically coupled to an output of the modulator to receive the modulated carrier signal,
a second thin film electro-acoustic transducer, and
a coupling substrate for acoustically coupling and providing an electrical isolation barrier between the first and second thin film electro-acoustic transducers; and
a demodulator mounted on a third substrate, the demodulator configured to generate an output data signal from a signal received from the second thin film electro-acoustic transducer.

* * * * *